(12) United States Patent
Okazaki et al.

(10) Patent No.: US 10,750,579 B2
(45) Date of Patent: Aug. 18, 2020

(54) INDUCTION HEATING DEVICE AND POWER GENERATION SYSTEM

(71) Applicants: Sumitomo Electric Industries, Ltd., Osaka-shi (JP); Kyoto University, Kyoto-shi (JP)

(72) Inventors: Toru Okazaki, Osaka (JP); Tetsuji Matsuo, Kyoto (JP)

(73) Assignees: Sumitomo Electric Industries, Ltd., Osaka-shi (JP); Kyoto University, Kyoto-shi (JP)

( * ) Notice: Subject to any disclaimer, the term of this patent is extended or adjusted under 35 U.S.C. 154(b) by 244 days.

(21) Appl. No.: 15/766,603

(22) PCT Filed: Jul. 20, 2016

(86) PCT No.: PCT/JP2016/071233
§ 371 (c)(1),
(2) Date: Apr. 6, 2018

(87) PCT Pub. No.: WO2017/061160
PCT Pub. Date: Apr. 13, 2017

(65) Prior Publication Data
US 2018/0295678 A1    Oct. 11, 2018

(30) Foreign Application Priority Data
Oct. 8, 2015   (JP) .................................. 2015-200597

(51) Int. Cl.
*H05B 6/10*   (2006.01)
*H05B 6/44*   (2006.01)
(Continued)

(52) U.S. Cl.
CPC .............. *H05B 6/109* (2013.01); *F03D 9/18* (2016.05); *F03D 9/22* (2016.05); *F03D 9/25* (2016.05);
(Continued)

(58) Field of Classification Search
CPC . H05B 6/02; H05B 6/04; H05B 6/108; H05B 6/109; H05B 6/44; H02K 49/02;
(Continued)

(56) References Cited

U.S. PATENT DOCUMENTS

2012/0193924 A1* 8/2012 Okazaki .................... F03D 9/22
                                                            290/55
2014/0110938 A1* 4/2014 Okazaki ................. H05B 6/108
                                                            219/631

FOREIGN PATENT DOCUMENTS

JP    2005-174801 A    6/2005
JP    2011-159595 A    8/2011
JP    2012-256507 A    12/2012

* cited by examiner

*Primary Examiner* — Hung D Nguyen
(74) *Attorney, Agent, or Firm* — Baker Botss L.L.P.; Michael A. Sartori

(57) ABSTRACT

An induction heating device includes: a rotor having a rotation shaft; a heating part disposed to be opposed to the rotor at a distance; a magnetic flux generating part provided at the rotor to generate magnetic flux for the heating part; a magnetic flux guide part provided on an opposed surface side of the heating part that is opposed to the magnetic flux generating part to guide the magnetic flux from the magnetic flux generating part to the heating part; and a flow passage provided in the heating part to allow a heating medium to circulate. The magnetic flux guide part includes magnetic substance parts. The magnetic flux guide part has a structure in which the magnetic substance parts and the insulator parts extend along a direction from the magnetic flux generating part to the heating part and are alternately layered along a circumferential direction of the heating part.

8 Claims, 16 Drawing Sheets

(51) Int. Cl.
*F03D 9/22* (2016.01)
*H05B 6/04* (2006.01)
*F03D 9/18* (2016.01)
*F03D 9/25* (2016.01)

(52) U.S. Cl.
CPC ............... *H05B 6/04* (2013.01); *H05B 6/108* (2013.01); *H05B 6/44* (2013.01); *Y02E 10/725* (2013.01)

(58) Field of Classification Search
CPC .. H02K 49/043; H02K 49/046; H02K 49/108; F03D 9/007; F03D 9/17; F03D 9/18; F03D 9/22; F03D 9/25; F03D 9/28; F03D 7/0244; Y02E 10/725
USPC ....... 219/600, 628, 629, 630, 631, 632, 635, 219/672, 676, 677
See application file for complete search history.

12 : 121, 122

INDUCTION HEATING DEVICE AND POWER GENERATION SYSTEM

TECHNICAL FIELD

The present invention relates to an induction heating device and a power generation system.

The subject application claims the priority based on Japanese Patent Application No. 2015-200597 filed on Oct. 8, 2015, the entire contents of which are hereby incorporated by reference.

BACKGROUND ART

An eddy current heating device described in PTD 1 (Japanese Patent Laying-Open No. 2005-174801) includes a rotor having permanent magnets disposed on the outer periphery thereof and a heating part made of a conductive material that is fixed to the outside of the rotor and has a flow passage inside thereof for circulating water.

PTD 2 (Japanese Patent Laying-Open No. 2011-159595) and PTD 3 (Japanese Patent Laying-Open No. 2012-256507) disclose an induction heating device. The induction heating device includes a rotor, a magnetic flux generating part provided on the outer periphery of the rotor to generate magnetic flux in the radial direction of the rotor, a tubular heating part disposed on the outside of the rotor at a distance from the rotor, and a flow passage provided in the heating part to allow a heating medium to circulate. PTD 2 describes the heating part formed of a conductive material such as aluminum, copper, or iron. PTD 3 describes a structure including a heating part made of a composite material of a magnetic material (material with a high magnetic permeability μ) and a conductive material (material with a high conductivity a such as an aluminum-based material or a copper-based material), a magnetic material part, and a conductive material part.

CITATION LIST

Patent Documents

PTD 1: Japanese Patent Laying-Open No. 2005-174801
PTD 2: Japanese Patent Laying-Open No. 2011-159595
PTD 3: Japanese Patent Laying-Open No. 2012-256507

SUMMARY OF INVENTION

An induction heating device according to the present disclosure heats a heating medium. The induction heating device includes: a rotor having a rotation shaft; a heating part disposed to be opposed to the rotor at a distance; a magnetic flux generating part provided at the rotor to generate magnetic flux for the heating part; a magnetic flux guide part provided on an opposed surface side of the heating part that is opposed to the magnetic flux generating part to guide the magnetic flux from the magnetic flux generating part to the heating part; and a flow passage provided in the heating part to allow the heating medium to circulate. The magnetic flux guide part includes magnetic substance parts formed of a magnetic material and insulator parts formed of a non-magnetic and electrically insulating material. The magnetic flux guide part has a structure in which the magnetic substance parts and the insulator parts extend along a direction from the magnetic flux generating part to the heating part and are alternately layered along a circumferential direction of the heating part.

A power generation system according to the present disclosure includes: the induction heating device described above; and a power generating part configured to convert heat of the heating medium heated by the induction heating device into electric energy.

DESCRIPTION OF EMBODIMENTS

Figure 1A:
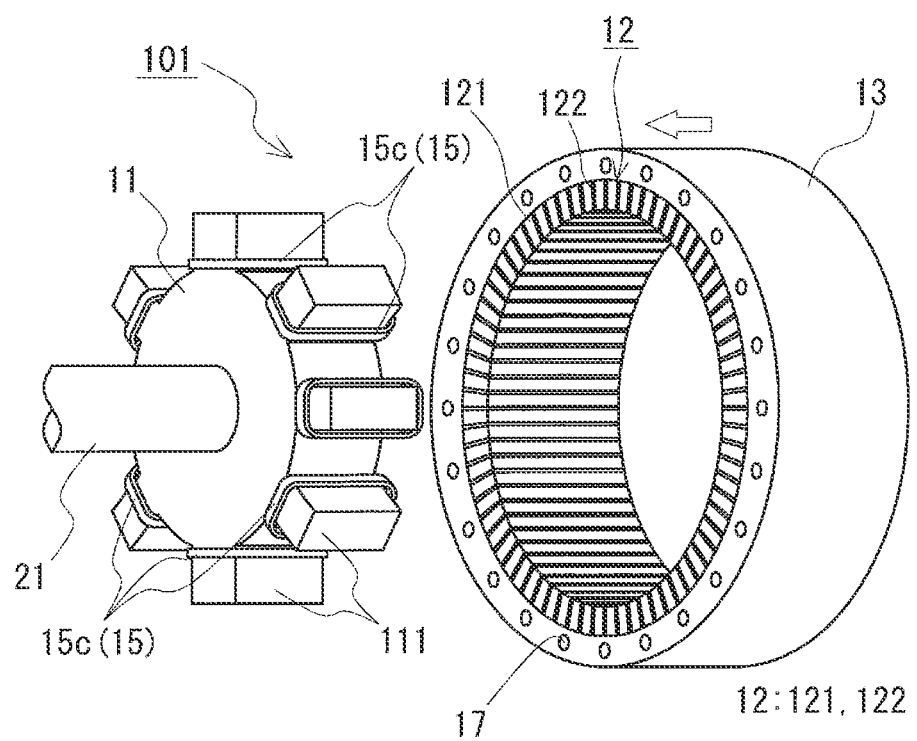
FIG. 1A is a schematic exploded perspective view showing an induction heating device according to a first embodiment.

Problems to be Solved by the Present Disclosure

In the conventional induction heating device described above, the magnetic flux generating part provided on the rotor and the heating part are opposed to each other, and the magnetic flux generating part is provided at a position near the heating part. The magnetic flux generating part is thus easily affected by heat from the heating part. Eddy current is produced in the heating part. Because of the skin effect, eddy current is produced more on the opposed surface side of the heating part that is opposed to the magnetic flux generating part. Accordingly, the opposed surface side of the heating part mainly generates heat. In the conventional induction heating device, radiation heat from the heating part that generates heat tends to increase the temperature of the magnetic flux generating part. When the temperature of the magnetic flux generating part rises, the magnetic characteristics of the magnetic flux generating part are reduced, so that the magnetic flux (magnetic field) produced from the magnetic flux generating part may be reduced. The amount of heat generation (thermal energy) by induction heating (eddy current) is proportional to the square of the magnetic field intensity. Accordingly, if the magnetic characteristics of the magnetic flux generating part are reduced, the amount of heat generation is reduced in the heating part.

In order that the magnetic flux generating part is less affected by heat from the heating part, the distance between the magnetic flux generating part and the heating part may be increased, or a heat insulating material may be disposed between the magnetic flux generating part and the heating part. However, in these cases, the magnetic flux generating part and the heating part are at a distance from each other. If a non-magnetic substance is interposed between the magnetic flux generating part and the heating part, the magnetic flux flowing through the heating part decreases and the amount of heat generation in the heating part is reduced, because the magnetic field intensity decreases as the distance increases. Alternatively, a cooling mechanism for cooling the magnetic flux generating part may be provided. However, in this case, the structure of the induction heating device is complicated, or the cost is increased.

An object of the present disclosure is to provide an induction heating device in which temperature increase of the magnetic flux generating part can be suppressed and the amount of heat generation in the heating part can be increased. Another object of the present disclosure is to provide a power generation system including the induction heating device.

Effects of the Present Disclosure

According to the present disclosure, in the induction heating device, temperature increase of the magnetic flux generating part can be suppressed and the amount of heat generation in the heating part can be increased. According to the present disclosure, in the power generation system, the power generation efficiency can be improved.

DESCRIPTION OF EMBODIMENTS OF THE PRESENT INVENTION

First of all, embodiments of the present invention will be described one by one below.

(1) An induction heating device according to an aspect of the present invention heats a heating medium. The induction heating device includes: a rotor having a rotation shaft; a heating part disposed to be opposed to the rotor at a distance; a magnetic flux generating part provided at the rotor to generate magnetic flux for the heating part; and a magnetic flux guide part provided on the opposed surface side of the heating part that is opposed to the magnetic flux generating part to guide the magnetic flux from the magnetic flux generating part to the heating part; and a flow passage provided in the heating part to allow the heating medium to circulate. The magnetic flux guide part includes magnetic substance parts made of a magnetic material and insulator parts formed of a non-magnetic and electrically insulating material. The magnetic flux guide part has a structure in which the magnetic substance parts and the insulator parts extend along a direction from the magnetic flux generating part to the heating part and are alternately layered along the circumferential direction of the heating part.

In the induction heating device, the magnetic flux guide part is provided on the opposed surface side of the heating part. The magnetic flux generated in the magnetic flux generating part thus passes through the magnetic substance parts of the magnetic flux guide part, and therefore the magnetic flux from the magnetic flux generating part can be transmitted to the heating part. The magnetic substance parts of the magnetic flux guide part are formed of a magnetic material, allow the magnetic flux from the magnetic flux generating part to flow, and form a magnetic path that conducts the magnetic flux between the magnetic flux generating part and the heating part. The magnetic flux guide part has a structure in which the magnetic substance parts and the insulator parts are alternately layered. The insulator parts formed of a non-magnetic and electrically insulating material are each interposed between the magnetic substance parts. Accordingly, even when magnetic flux flows through the magnetic substance part, eddy current produced in the magnetic substance part is separated by the insulator part and thus eddy current hardly flows. Because of this, occurrence of eddy current is suppressed in the magnetic substance parts and magnetic flux is less consumed as thermal energy, thereby suppressing diffusion of the magnetic flux. Accordingly, the magnetic flux guide part can conduct the magnetic flux from the magnetic flux generating part to the heating part without diffusing. In addition, in the magnetic flux guide part, heat generation by eddy current can also be suppressed. The magnetic flux flowing through the magnetic substance part is less likely to flow in the direction of the adjacent magnetic substance part (that is, the circumferential direction of the heating part) because of the insulator part. In the magnetic flux guide part, magnetic flux is easily guided along the direction from the magnetic flux generating part to the heating part.

In the induction heating device, the magnetic flux guide part is provided on the opposed surface side of the heating part. This suppresses heat generation by eddy current in the magnetic flux guide part. Furthermore, since the magnetic flux generating part and the heating part are at a distance from each other, the effect of heat on the magnetic flux generating part can be reduced, and increase in temperature of the magnetic flux generating part can be suppressed. Furthermore, even when the magnetic flux generating part and the heating part are at a distance from each other, the magnetic flux from the magnetic flux generating part can be conducted through the magnetic flux guide part to the heating part without diffusing. Accordingly, the amount of heat generation in the heating part can be increased.

The magnetic material that forms the magnetic substance part is a material with a high magnetic permeability. For example, a material with a relative permeability of 500 or more is preferable, and a material with a relative permeability of 1000 or more is more preferable. Specifically, examples include metals such as iron, nickel, and cobalt, magnetic metals including alloys such as magnetic steel (silicon steel), Sendust, permalloy, and magnetic stainless steel, and magnetic oxides such as ferrite and magnetite. Examples of the magnetic stainless steel include martensitic stainless steels (example: SUS 420J2), ferritic stainless steels (example: SUS 430), and austenitic/ferritic stainless steels (example: SUS 329J4L). The non-magnetic and electrically insulating material that forms the insulator part is a material with low magnetic permeability and with high electric resistance, for example, a material with a relative permeability of 3 or less and with a volume resistivity of $10^7$ $\Omega \cdot m$ or more is preferable. Specifically, examples include resins, ceramics, and glass.

(2) In an embodiment of the induction heating device, the magnetic flux guide part includes a layered body including a plurality of electrical steel sheets, the electrical steel sheets being layered and each having an insulating coating.

Since electrical steel sheets each having an insulating coating are layered, the magnetic flux guide part can be easily formed. In this case, the electrical steel sheet corresponds to the magnetic substance part, and the insulating coating on the surface of the electrical steel sheet corresponds to the insulator part.

(3) In an embodiment of the induction heating device, the magnetic flux guide part is provided over the entire opposed surface of the heating part.

Since the magnetic flux guide part is provided over the entire opposed surface of the heating part, magnetic flux can be conducted to the entire heating part. Accordingly, the amount of heat generation in the heating part can be easily increased.

(4) In an embodiment of the induction heating device, a plurality of the magnetic flux guide parts are provided on the opposed surface of the heating part with spacing in the circumferential direction of the heating part.

Since a plurality of magnetic flux guide parts are provided with spacing, the spacing between the magnetic flux guide parts prevents magnetic flux from transferring to the adjacent magnetic flux guide part. Thus, in the magnetic flux guide part, magnetic flux is guided along the direction from the magnetic flux generating part to the heating part.

(5) In an embodiment of the induction heating device described in (4) above, a heat insulating material is disposed in the spacing between the magnetic flux guide parts.

Since the heat insulating material is disposed between the magnetic flux guide parts, heat dissipation from the heating part can be reduced. Since heat loss from the heating part can be suppressed, the heating efficiency of the heating medium can be improved. Since the heat insulating material is generally a non-magnetic substance, movement of magnetic flux to the adjacent magnetic flux guide part is suppressed. Examples of the heat insulating material include rock wool, glass wool, foamed plastic, brick, and ceramic.

(6) In an embodiment of the induction heating device, the flow passage is formed such that the heating part and the magnetic flux guide part are provided with respective flow passages and one ends of the flow passages are connected to each other so that the flow passages form a round-trip passage. Of the flow passages, one flow passage provided in the magnetic flux guide part is an exit path of the heating medium, and the other flow passage provided in the heating part serves as a return path of the heating medium.

Since the respective flow passages are provided in the heating part and the magnetic flux guide parts and form a round-trip path, not only heat generated in the heating part but also heat conducted from the heating part to the magnetic flux guide part can be recovered through the heating medium. Since the recovery ratio of heat generated in the heating part can be improved, the heating medium can be heated efficiently. When one flow passage provided in the magnetic flux guide part is an exit path of the heating medium, the heating medium at low temperature is supplied to the flow passage provided in the magnetic flux guide part, and the magnetic flux guide part is thereby cooled. Since temperature increase of the magnetic flux guide part can be suppressed effectively, the effect of heat on the magnetic flux generating part can be reduced more. Accordingly, temperature increase of the magnetic flux generating part can be suppressed more.

(7) In an embodiment of the induction heating device, the rotation shaft is connected to a wind turbine.

An electric motor or a machine that generates kinetic energy using fuel as an energy source can be used as a motive power source for rotating the rotor (rotation shaft). It is preferable to use renewable energy such as wind power, water power, and wave power. The production of $CO_2$ can be suppressed by using renewable energy as motive power of the rotor. Since the rotation shaft is connected to a wind turbine, wind power can be utilized as motive power of the rotor.

(8) A power generation system according to an aspect of the present invention includes the induction heating device of any one of (1) to (7) above; and a power generating part configured to convert heat of the heating medium heated by the induction heating device into electric energy.

The power generation system includes the induction heating device according to an aspect of the present invention. Accordingly, in the induction heating device, while temperature increase of the magnetic flux generating part can be suppressed, the amount of heat generation in the heating part can be increased. Thus, the heating efficiency of the heating medium in the induction heating device can be improved and therefore the power generation efficiency can be improved.

The power generation system generates power using heat of the heating medium heated by the induction heating device. For example, the rotation shaft of the induction heating device is connected to a wind turbine so that wind power is used as motive power of the rotor. In this case, wind energy is converted into rotation energy, and the rotation energy is converted into thermal energy. The thermal energy is converted into electric energy, and the electric energy can be extracted. As an example, water as a heating medium is heated to generate high-temperature and high-pressure vapor. Using the vapor, a steam turbine allows a power generator to rotate to generate power. Furthermore, because of the configuration of converting heat into electric energy, energy can be stored in the form of heat using a heat accumulator. Thus, a power generation system capable of stably generating power can be implemented.

Details of Embodiments of the Present Invention

Specific examples of the induction heating device and the power generation system according to embodiments of the present invention will be described below with reference to the drawings. The same reference signs in the drawings denote the same or corresponding parts. The present invention is not limited to the illustrated examples but shown by the claims, and it is intended that all equivalents to the claims and modifications within the scope of the claims are embraced.

Induction Heating Device

First Embodiment

Figure 1B:
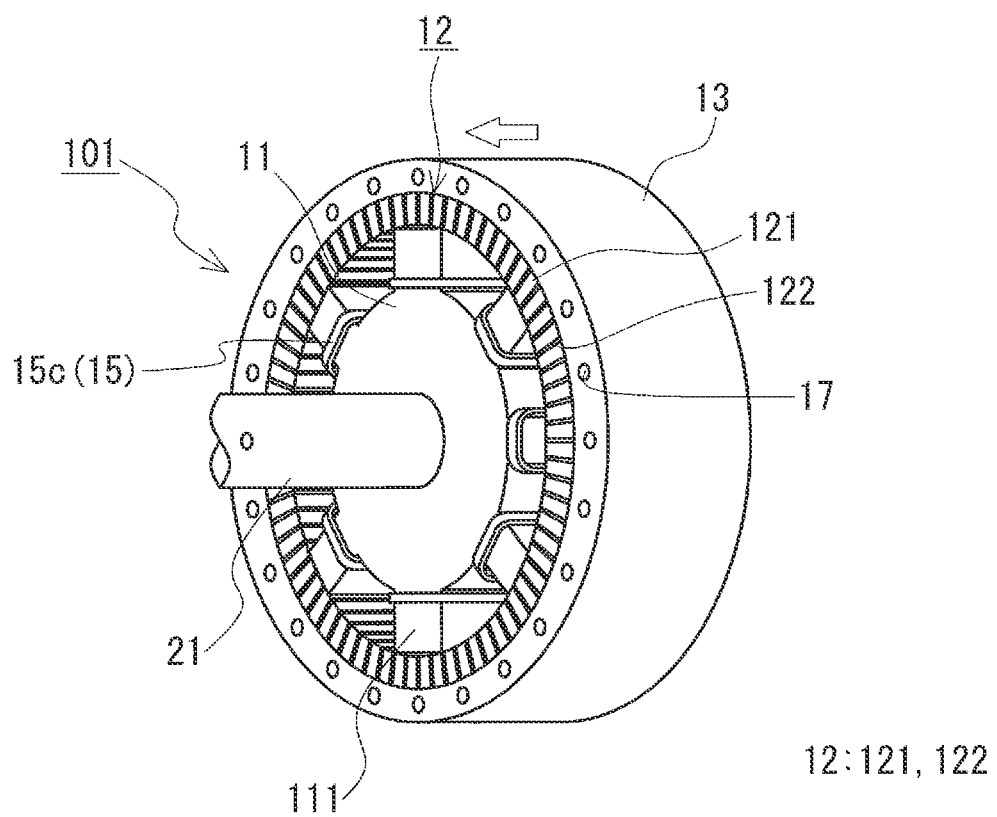
FIG. 1B is a schematic assembly perspective view showing the induction heating device according to the first embodiment.
Figure 2:
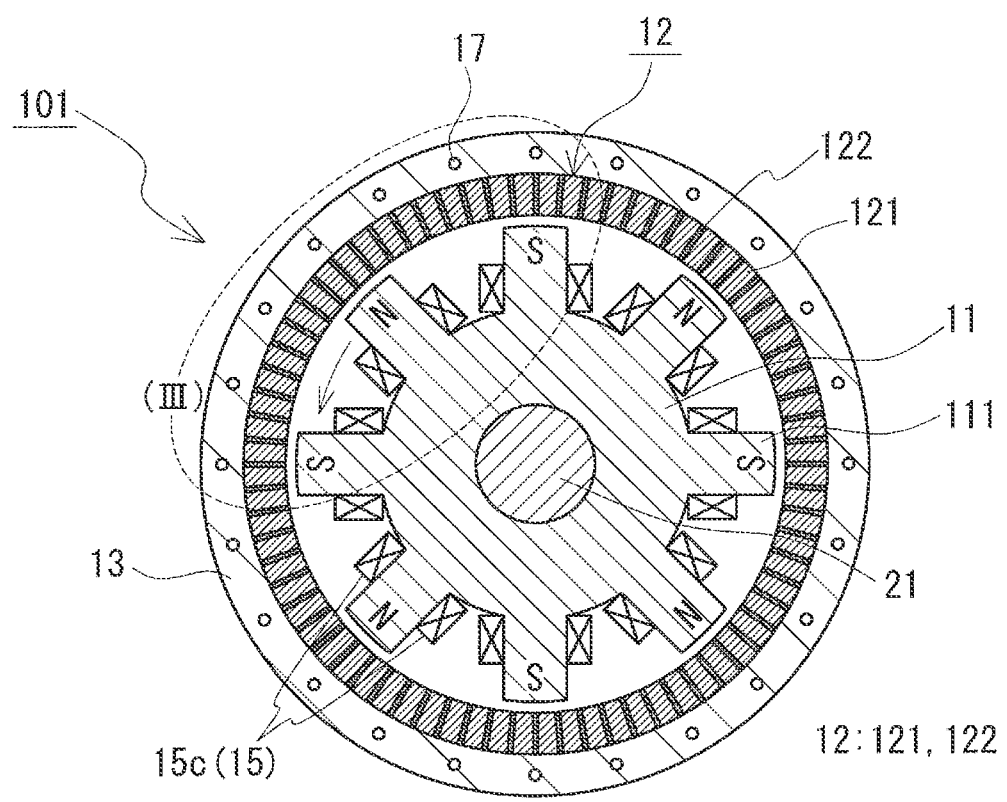
FIG. 2 is a schematic cross-sectional view showing the induction heating device according to the first embodiment.
Figure 3:
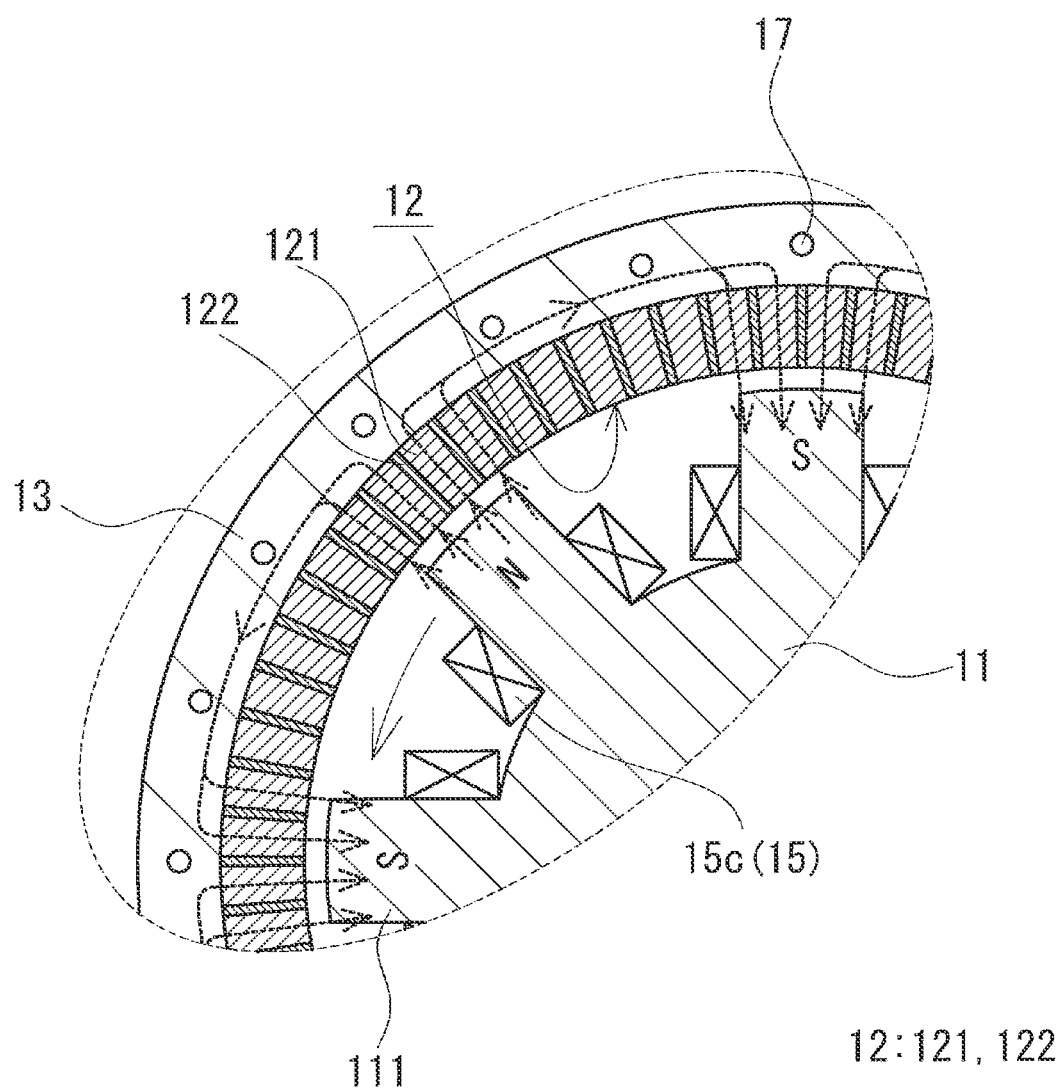
FIG. 3 is an enlarged view of the portion surrounded by the line III in FIG. 2.

Referring to FIG. 1 to FIG. 3, an induction heating device 101 according to a first embodiment will be described. Induction heating device 101 includes a rotor 11, a heating part 13, a magnetic flux generating part 15, a magnetic flux guide part 12, and a flow passage 17. Induction heating device 101 is a radial gap-type structure in which magnetic flux generating part 15 and heating part 13 are disposed to be opposed to each other at a distance in the radial direction of rotor 11. The configuration of induction heating device 101 will be described in detail below.

(Rotor)

Rotor 11 is a tubular or column-shaped member coupled to one end side of a rotation shaft 21 rotatably supported by a bearing (not shown). In this example, a through hole is formed at the center axis of the cylindrical rotor 11, rotation shaft 21 is inserted into the through hole, and rotor 11 is fixed to rotation shaft 21. On the outer periphery of rotor 11, a plurality of projections 111 are formed to protrude in the radial direction. In this example, rotor 11 has eight projections 111, and projections 111 are formed at regular intervals in the circumferential direction of the rotor 11. On the outer periphery of rotor 11, magnetic flux generating part 15 (in this example, coil 15c) described later is also provided. Here, it is assumed that rotor 11 rotates counter-clockwise (the arrow in FIG. 2 and FIG. 3 shows the rotation direction). For example, a wind turbine (not shown) is connected to rotation shaft 21 so that wind power can be used as motive power of rotor 11. Rotation shaft 21 may be included in rotor 11 as a part of rotor 11.

Rotor 11 may be formed of any material that has mechanical strength and can support magnetic flux generating part 15, either a magnetic material or a non-magnetic material. Materials excellent in structural strength and long-term durability (weather resistance and corrosion resistance) are preferred as the material that forms rotor 11. Examples of the material that forms rotor 11 include metals such as iron, steel, stainless steel, aluminum alloy, magnesium alloy for use in structural materials and composite materials such as GFRP (glass fiber reinforced plastics) and CFRP (carbon fiber reinforced plastics).

In this example, rotor 11 (including projections 111) is formed of a magnetic material. When a normal conducting coil is used for magnetic flux generating part 15 (coil 15c), rotor 11 is preferably formed of a magnetic material. On the other hand, when a superconducting coil is used for magnetic flux generating part 15 (coil 15c), rotor 11 can be formed of either a magnetic material or a non-magnetic material. When a superconducting coil is used, the generated magnetic field may be limited due to magnetic flux saturation of rotor 11. Therefore, rotor 11 is preferably formed of a non-magnetic material in some cases.

(Heating Part)

Heating part 13 is a tubular member disposed to be opposed to rotor 11 at a distance and provided on the outer circumference side of rotor 11. Heating part 13 is disposed to be opposed to rotor 11 at a distance in the radial direction and fixed to a casing (not shown) so as not to rotate. As described later, magnetic flux from magnetic flux generating part 15 flows through heating part 13 to generate eddy current in heating part 13. Heating part 13 generates heat by induction heating.

Heating part 13 is formed of a magnetic material in which magnetic flux flows to generate eddy current and generate heat, for example, magnetic metal. Examples of the magnetic metal include metals such as iron, nickel, and cobalt, and alloys such as magnetic steel (silicon steel), Sendust, permalloy, and magnetic stainless steel. Examples of the magnetic stainless steel include martensitic stainless steels (example: SUS 420J2), ferritic stainless steels (example: SUS 430), and austenitic/ferritic stainless steels (example: SUS 329J4L). The magnetic material that forms heating part 13 preferably has a relative permeability of 500 or more, more preferably a relative permeability of 1000 or more. In this example, heating part 13 is formed of iron. The thickness (the thickness in the radial direction) of heating part 13 is set such that even when magnetic flux caused by magnetic flux generating part 15 flows, heating part 13 is not magnetically saturated and sufficient eddy current flows by the magnetic flux (the thickness of at least the skin depth or more).

(Magnetic Flux Generating Part)

Magnetic flux generating part 15 is provided at rotor 11 and generates magnetic flux for heating part 13. In this example, magnetic flux generating part 15 is provided on the outer circumference of rotor 11 so as to be opposed to heating part 13, and magnetic flux generating part 15 generates magnetic flux in the radial direction of rotor 11 (the direction of heating part 13). Specifically, a coil 15c is used as magnetic flux generating part 15. Coil 15c (eight coils, in total) is wound around each projection 111 of rotor 11. When projection 111 is formed of a magnetic material, coil 15c and projection 111 constitute magnetic flux generating part 15. A direct current power source (not shown) is connected to each coil 15c. The direction of magnetic field (magnetic flux) to be produced is determined by controlling the direction of current fed to each coil 15c. The polarities of adjacent coils 15c are different from each other (see FIG. 2). For example, coil 15c is connected to an external power supply through a slip ring so that current is supplied to coil 15c.

As magnetic flux generating part 15, a permanent magnet may be used in place of a coil (electromagnet). Examples of the coil include a normal conducting coil of copper wire and a superconducting coil formed of a superconducting wire material. When a coil is used for magnetic flux generating part 15, current fed to the coil is increased to produce a strong magnetic field. The strength of the magnetic field can be adjusted by controlling the supplied current. Since the amount of heat generation by induction heating (eddy current) is proportional to the square of the magnetic field strength, the coil can easily increase the amount of heat generation, compared with a permanent magnet. With a coil, reduction in magnetic characteristics due to temperature increase or degradation in magnetic characteristics over time is less likely to occur, compared with a permanent magnet. Therefore, when a coil is used for magnetic flux generating part 15, a sufficient magnetic field strength is easily kept by increasing the supplied current, and performance (thermal energy) sufficient for heating a heating medium to a predetermined temperature (for example, 100° C. to 600° C., preferably 200° C. to 350° C.) suitable for power generation is easily obtained. Direct current may be fed to the coil to generate a direct current magnetic field. In the case of a superconducting coil in a superconducting state in which electric resistance is substantially zero, heat generation (loss) substantially does not occur in the coil even when large current flows through the superconducting coil. Therefore, compared with a normal conducting coil, heat generation (loss) in the coil caused by feeding large current can be suppressed, and an extremely strong magnetic field can be kept with no power loss. In this example, each coil 15c is a superconducting coil. The superconducting coil is covered with a cooling jacket (not shown) on the periphery so that the superconducting coil is cooled and thus kept in a superconducting state. A normal conducting coil may be used for coil 15c. Alternatively, in place of coil 15c, a permanent magnet may be used as magnetic flux generating part 15.

(Magnetic Flux Guide Part)

Magnetic flux guide part 12 is provided on the opposed surface side of heating part 13 that is opposed to magnetic flux generating part 15 to guide magnetic flux from magnetic flux generating part 15 to heating part 13. In this example, magnetic flux guide part 12 is fixed to the inner circumferential surface of heating part 13. The magnetic flux generated in magnetic flux generating part 15 is conducted to heating part 13 through magnetic flux guide part 12. Magnetic flux guide part 12 is provided over the entire inner circumferential surface of heating part 13.

Magnetic flux guide part 12 has magnetic substance parts 121 formed of a magnetic material and insulator parts 122 formed of a non-magnetic and electrically insulating material. In the cross-section orthogonal to the axial direction of heating part 13, magnetic substance parts 121 and insulator parts 122 extend along the direction from magnetic flux generating part 15 to heating part 13 and are alternately layered in the circumferential direction of heating part 13. In this example, magnetic substance part 121 is a thin plate-shaped member and disposed along the radial direction of heating part 13. A plurality of magnetic substance parts 121 are layered with insulator parts 122 interposed in the circumferential direction of heating part 13 (the rotation direction of magnetic flux generating part 15).

Magnetic substance part 121 of magnetic flux guide part 12 forms a magnetic path that allows the magnetic flux from magnetic flux generating part 15 to flow and conducts the magnetic flux between magnetic flux generating part 15 and heating part 13. Magnetic substance parts 121 and insulator parts 122 are alternately layered, and insulator part 122 is interposed between magnetic substance parts 121. Even when magnetic flux flows through magnetic substance part 121, eddy current produced in magnetic substance part 121 is separated by insulator part 122 and thus eddy current is reduced. Accordingly, in magnetic substance part 121, generation of eddy current is suppressed and change in magnetic flux is not interrupted, so that diffusion of the magnetic flux is suppressed. Accordingly, magnetic flux from magnetic flux generating part 15 can be conducted to heating part 13 through magnetic flux guide part 12 without being diffused. In magnetic flux guide part 12, heat generation by eddy current is also suppressed. Furthermore, magnetic flux flowing through magnetic substance part 121 is less likely to flow in the direction of the adjacent magnetic substance part 121 (that is, the circumferential direction of heating part 13) because of insulator part 122. The magnetic flux is mainly guided along the direction from magnetic flux generating part 15 to heating part 13.

The magnetic material that forms magnetic substance part 121 preferably has a relative permeability of 500 or more, more preferably a relative permeability of 1000 or more. Examples of such a magnetic material include the magnetic metals described above and magnetic oxides such as ferrite and magnetite. It is preferable that the non-magnetic and electrically insulating material that forms insulator part 122 has a relative permeability of 3 or less and a volume resistivity of $10^7$ Ω·m or more. Examples of such a material include resins, ceramics and glass. In this example, magnetic flux guide part 12 is formed of a layered body including a plurality of electrical steel sheets each having an insulating coating. The electrical steel sheet corresponds to magnetic substance part 121, and the insulating coating corresponds to insulator part 122. The layered body of electrical steel sheets may be formed by adhering electrical steel sheets with adhesive. The insulating coating on the electrical steel sheet is formed of an oxide coating or a coating film. Examples of the insulating coating include phosphate coating, silicate coating, organic varnish coating, and enamel coating.

The thickness (the thickness in the layering direction) of magnetic substance part 121 is set such that even when magnetic flux from magnetic flux generating part 15 flows through magnetic substance part 121, magnetic substance part 121 is not magnetically saturated and occurrence of eddy current can be suppressed. The thickness of magnetic substance part 121 (electrical steel sheet) is, for example, 0.1 mm or more to 1 mm or less, preferably 0.2 mm or more to 0.5 mm or less. The thickness of insulator part 122 is set such that eddy current produced in magnetic substance part 121 can be separated and movement of magnetic flux flowing through magnetic substance part 121 toward the adjacent magnetic substance part 121 can be suppressed. The thickness of insulator part 122 (insulating coating) is, for example, 0.1 μm or more to 5 μm or less, preferably, 1 μm or more to 3 μm or less. In FIG. 2, magnetic substance part 121 and insulator part 122 are exaggeratingly shown.

(Flow Passage)

Heating part 13 is provided with flow passage 17 through which a heating medium circulates. In this example, flow passage 17 is provided along the axial direction of heating part 13, and a heating medium circulates from one side to the other side in the axial direction of heating part 13 (from the right side to the left side in the drawing sheet in FIG. 1) (the white arrow in FIG. 1 shows the direction of circulation of the heating medium). Flow passage 17 is formed by forming a through hole in the inside of heating part 13 and inserting piping into the through hole. Flow passage 17 can exchange heat with heating part 13. As long as heating part 13 and flow passage 17 are thermally connected, flow passage 17 may be formed at any place. Thus, flow passage 17 may be formed by disposing piping in contact with the outer circumferential surface of heating part 13. The piping is formed of a metal material that does not corrode even in contact with the heating medium, is excellent in thermal resistance, and has high thermal conductivity. Examples of the heating medium include water, water vapor, oil, liquid metal (Na, Pb, for example), liquid such as molten salt, and gas.

Referring now mainly to FIG. 3, the mechanism by which the heating medium is heated in induction heating device 101 will now be described.

Here, a description will be given, focusing on magnetic flux generating part 15 of the north pole shown in FIG. 3. The magnetic flux generated in the radial direction of rotor 11 from magnetic flux generating part 15 (coil 15c) of the north pole passes through magnetic substance part 121 of magnetic flux guide part 12 that is opposed to magnetic flux generating part 15, and is guided to heating part 13 (the dotted arrows in FIG. 3 show the flow of magnetic flux). Here, in magnetic substance part 121, since insulator part 122 suppresses generation of eddy current, change of the magnetic flux is less likely to be interrupted, and diffusion of the magnetic flux is suppressed. Accordingly, the magnetic flux from magnetic flux generating part 15 is not diffused through magnetic flux guide part 12 and is conducted to heating part 13. The magnetic flux reaching heating part 13 flows in heating part 13 in the circumferential direction, passes through magnetic substance part 121 of magnetic flux guide part 12 that is opposed to the south pole, and reaches magnetic flux generating part 15 of the south pole. That is, a magnetic path is formed in the shape of a loop extending from magnetic flux generating part 15 of the north pole through magnetic flux guide part 12 (magnetic substance part 121), heating part 13, and magnetic flux guide part 12 (magnetic substance part 121) to reach magnetic flux generating part 15 of the south pole. Magnetic flux generating part 15 rotates together with rotor 11 whereby magnetic flux generating part 15 moves relative to heating part 13. Accordingly, the direction of the magnetic flux flowing through heating part 13 changes, and the magnetic field periodically changes. As a result, eddy current is produced in heating part 13 whereby heating part 13 generates heat. The heat is conducted to the heating medium flowing through flow passage 17 to heat the heating medium.

The magnetic flux flowing through magnetic substance part 121 is less likely to flow in the direction of the adjacent magnetic substance part 121 because of insulator part 122. The magnetic flux is easily guided in the magnetic flux guide part 12 along the direction from magnetic flux generating part 15 to heating part 13. That is, since it is possible to suppress that the magnetic flux flowing through magnetic substance part 121 flows inside the magnetic flux guide part 12 in the circumferential direction, a shortcut of the loop-shaped magnetic path inside magnetic flux guide part 12 can be suppressed.

The number of magnetic flux generating parts 15 (coils 15c) can be set as appropriate. The fluctuation cycle of a magnetic field can be shortened by increasing the number of magnetic flux generating parts 15 to some extent. Based on that the amount of heat generation by induction heating is proportional to the frequency of a magnetic field, increase in the amount of heat generation can be expected by shortening the cycle of a magnetic field. The number of magnetic flux generating parts 15 is, for example, preferably four or more, more preferably six or more, further more preferably ten or more.

{Operation Effect}

In induction heating device 101 of the first embodiment, magnetic flux guide part 12 is provided on the inner circumferential surface of heating part 13 that is opposed to magnetic flux generating part 15, whereby magnetic flux from magnetic flux generating part 15 can be conducted to heating part 13 without being diffused. Heat generation by eddy current is suppressed in magnetic flux guide part 12, and in addition, magnetic flux generating part 15 and heating part 13 are at a distance from each other. Thus, in induction heating device 101, the effect of heat on magnetic flux generating part 15 can be reduced, thereby suppressing temperature increase of magnetic flux generating part 15. Even when magnetic flux generating part 15 and heating part 13 are at a distance from each other, magnetic flux from magnetic flux generating part 15 can be conducted to heating part 13 through magnetic flux guide part 12 without being diffused. Accordingly, the amount of heat generation in the heating part 13 can be increased.

[Modification 1-1]

Figure 4:
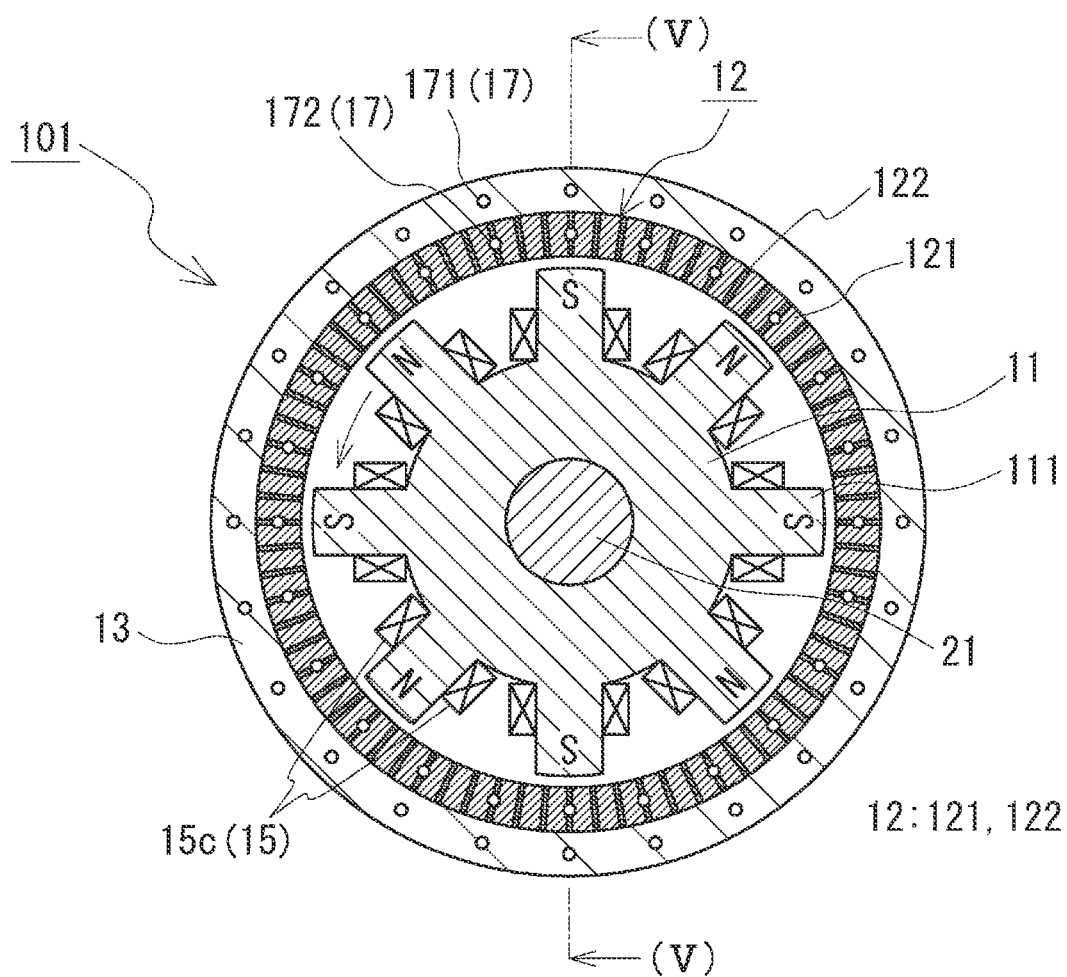
FIG. 4 is a schematic cross-sectional view showing Modification 1-1 of the induction heating device according to the first embodiment.
Figure 5:
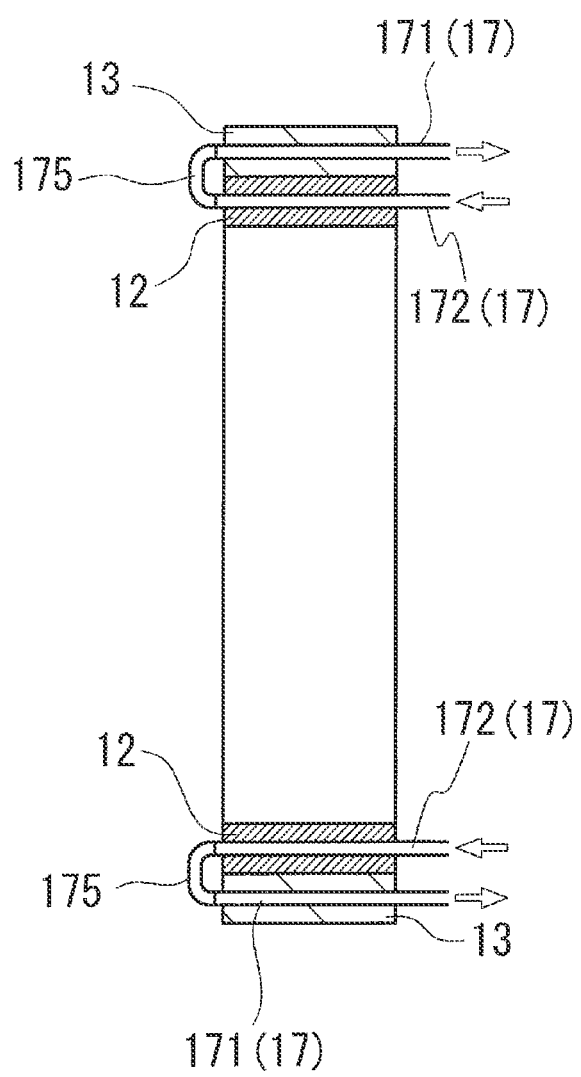
FIG. 5 is a schematic longitudinal-sectional view of a heating part and a magnetic flux guide part taken along the line V-V in FIG. 4.

In induction heating device 101 of the first embodiment, flow passage 17 is provided in heating part 13. Flow passage 17 may be provided not only in heating part 13 but also in magnetic flux guide part 12. In Modification 1-1, a manner in which flow passages 17 are provided in heating part 13 and magnetic flux guide part 12 will be described. Referring to FIG. 4 and FIG. 5, induction heating device 101 of Modification 1-1 will be described below, mainly focusing on the difference from the first embodiment.

In induction heating device 101 of Modification 1-1 shown in FIG. 4 and FIG. 5, a flow passage 171 and a flow passage 172 are respectively provided in heating part 13 and magnetic flux guide part 12. Flow passage 171 provided in heating part 13 is formed by forming a through hole along the axial direction of heating part 13 and inserting piping into this through hole. Flow passage 172 provided in magnetic flux guide part 12 is formed by forming a through hole along the axial direction of magnetic flux guide part 12 and inserting piping into this through hole, in the same manner as flow passage 171. In this example, one end of flow passage 171 is connected to one end of flow passage 172 through a connection pipe 175 (see FIG. 5), so that flow passage 17 is formed to be a round-trip passage including flow passages 171 and 172. Specifically, of flow passages 171 and 172, flow passage 172 is an exit path of the heating medium and flow passage 171 is a return path of the heating medium. In this example, as shown in FIG. 5, the heating medium is supplied from one side of flow passage 172, the heating medium circulating through flow passage 172 circulates to flow passage 171 through connection pipe 175 connected to the other end of flow passage 172, and the heating medium is discharged from one side of flow passage 171 (the white arrows in FIG. 5 show the supply/exit direction of the heating medium).

In induction heating device 101 of Modification 1-1, not only heat generated in heating part 13 but also heat conducted from heating part 13 to magnetic flux guide part 12 can be recovered through the heating medium. Accordingly, the recovery efficiency of heat generated in heating part 13 can be improved, and the heating medium can be heated efficiently. In addition, flow passage 172 provided in magnetic flux guide part 12 serves as an exit path of the heating medium, whereby the heating medium at low temperature is supplied to flow passage 172 to cool magnetic flux guide part 12. Accordingly, temperature increase of magnetic flux guide part 12 can be effectively suppressed. Therefore, since the effect of heat on magnetic flux generating part 15 can be reduced more, temperature increase of magnetic flux generating part 15 can be suppressed more.

[Modification 1-2]

Figure 6:
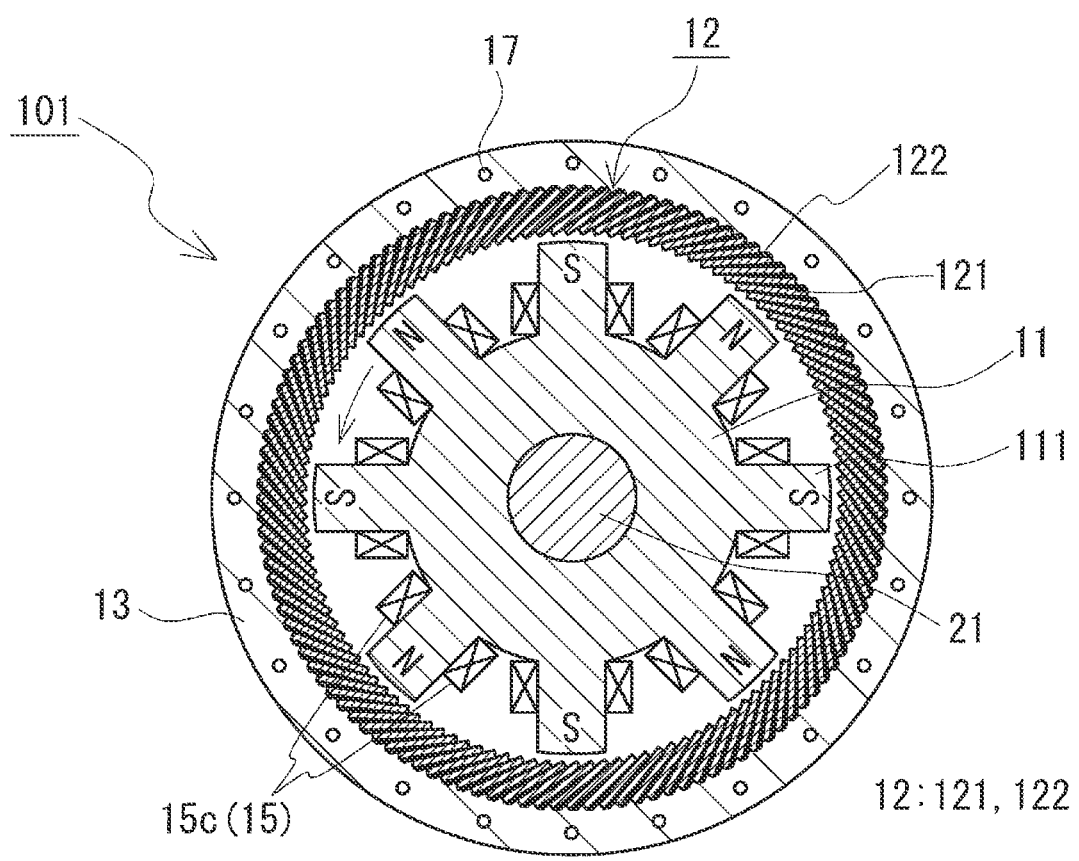
FIG. 6 is a schematic cross-sectional view showing Modification 1-2 of the induction heating device according to the first embodiment.

In induction heating device 101 of the first embodiment, in magnetic flux guide part 12, magnetic substance parts (electrical steel sheets) 121 are arranged with insulator parts (insulating coating) 122 interposed therebetween along the radial direction of heating part 13 (the direction orthogonal to the circumferential direction of heating part 13). As in Modification 1-2 shown in FIG. 6, magnetic substance parts 121 of magnetic flux guide part 12 may be arranged so as to be inclined relative to the radial direction of heating part 13. With this configuration, even when the thickness of magnetic flux guide part 12 (the thickness in the radial direction) and the distance between the outer circumferential surface of projection 111 of rotor 11 and the inner circumferential surface of magnetic flux guide part 12 are the same as those in the first embodiment, the length of magnetic substance part 121 serving as the main heat conduction path can be increased compared with the first embodiment. Insulator part 122 generally has large thermal resistance compared with magnetic substance part 121. The heat conduction path along the radial direction of magnetic substance part 121 is separated by insulator part 122 and is not a main heat conduction path. The heat conduction path along the direction along the inclination of magnetic substance part 121 is thought to be a main heat conduction path. Thus, since the thermal conduction distance between magnetic flux generating part 15 and heating part 13 is substantially increased, the effect of heat on magnetic flux generating part 15 can be reduced, and temperature increase of magnetic flux generating part 15 can be suppressed. On the other hand, even when magnetic substance part 121 serving as a main heat conduction path is long, magnetic substance part 121 can conduct the magnetic flux from magnetic flux generating part 15 to heating part 13 without diffusing, because magnetic substance part 121 itself is formed of a magnetic material.

Second Embodiment

Figure 7:
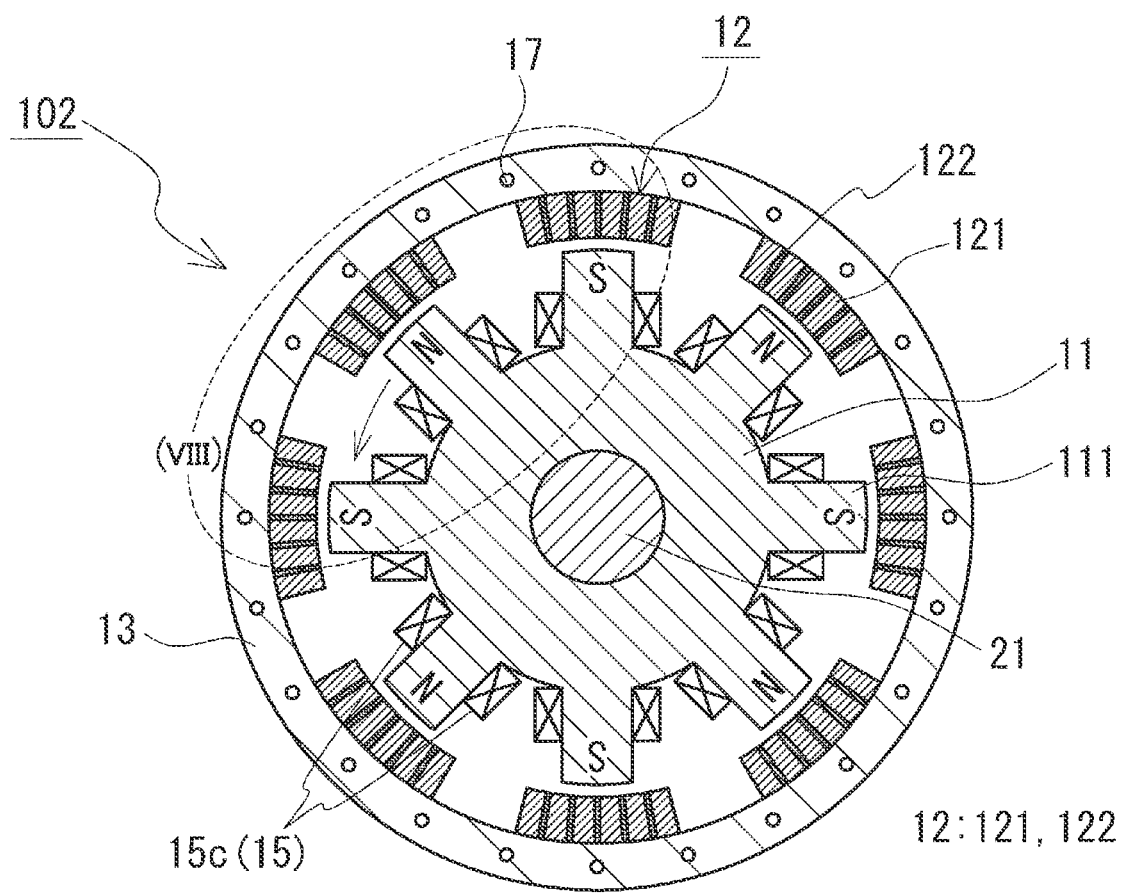
FIG. 7 is a schematic cross-sectional view showing an induction heating device according to a second embodiment.
Figure 8:
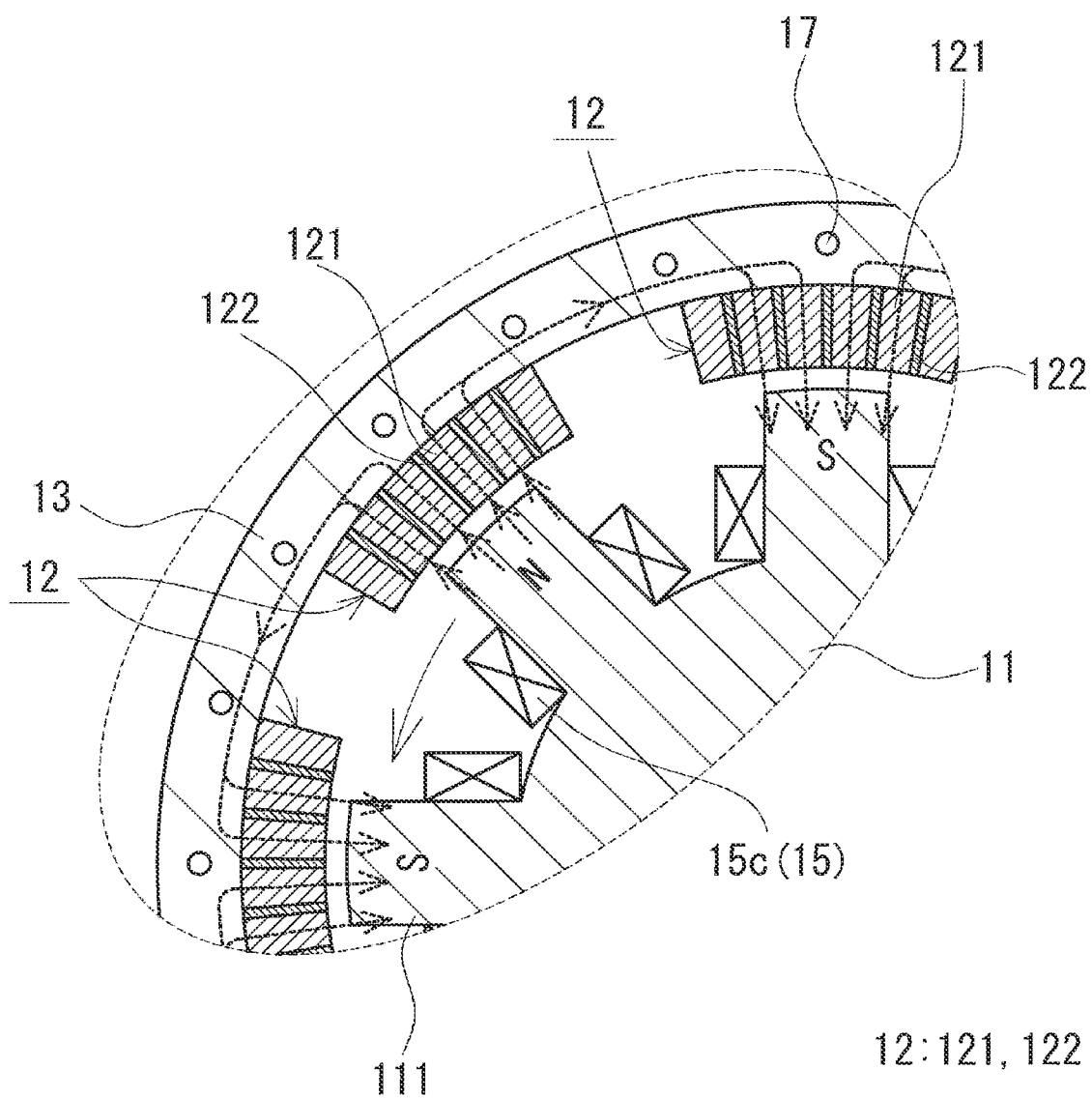
FIG. 8 is an enlarged view of the portion surrounded by the line VIII in FIG. 7.

In induction heating device 101 of the first embodiment, magnetic flux guide part 12 is provided over the entire circumference of the opposed surface (inner circumferential surface) of heating part 13. A plurality of magnetic flux guide parts 12 may be provided with spacing in the circumferential direction of the inner circumferential surface of heating part 13. In a second embodiment, a manner in which a plurality of magnetic flux guide parts 12 are provided on the opposed surface of heating part 13 with spacing in the circumferential direction of heating part 13. Referring to FIG. 7 and FIG. 8, an induction heating device 102 of the second embodiment will be described below, mainly focusing on the difference from the first embodiment.

In induction heating device 102 of the second embodiment shown in FIG. 7, a plurality of magnetic flux guide parts 12 are provided with spacing in the circumferential direction on the inner circumferential surface of heating part 13. Each magnetic flux guide part 12 is an arc-shaped layered body. In this case, as shown by the dotted arrows in FIG. 8, the movement of the magnetic flux flowing through a magnetic flux guide part 12 to adjacent magnetic flux guide part 12 is interrupted by the spacing between magnetic flux guide parts 12. Therefore, in magnetic flux guide part 12, magnetic flux can be guided along the direction from magnetic flux generating part 15 to heating part 13. That is, magnetic flux guide parts 12 are separated by the spacing, thereby preventing the magnetic flux generated from magnetic flux generating part 15 of the north pole from making a shortcut to magnetic flux generating part 15 of the south pole through magnetic flux guide part 12.

[Modification 2]

Figure 9:
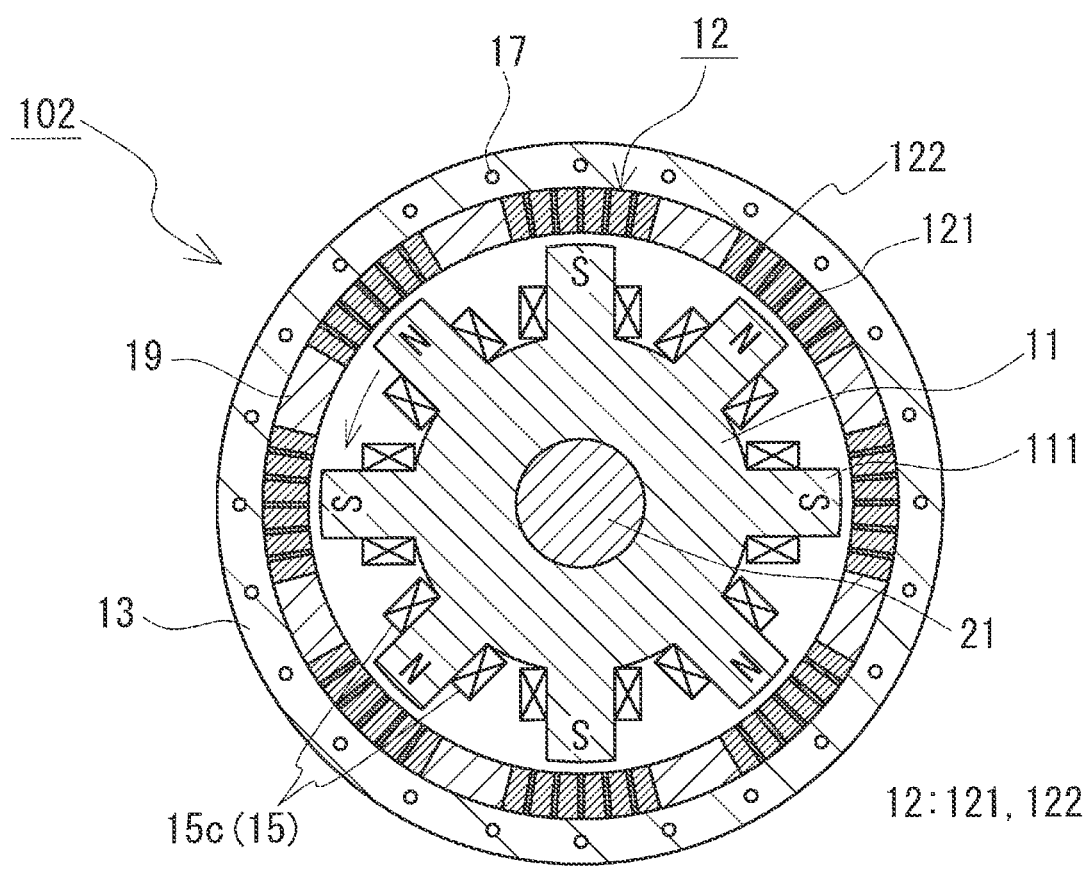
FIG. 9 is a schematic cross-sectional view showing Modification 2 of the induction heating device according to the second embodiment.

As in Modification 2 shown in FIG. 9, in induction heating device 102 of the second embodiment, a heat insulating material 19 may be disposed in the spacing between magnetic flux guide parts 12. Disposing heat insulating material 19 can reduce heat dissipation from heating part 13. This can suppress heat loss from heating part 13 and thus can improve the heating efficiency of the heating medium. Given that heat insulating material 19 is generally a non-magnetic substance, movement of magnetic flux to adjacent magnetic flux guide part 12 is interrupted. As heat insulating material 19, for example, rock wool, glass wool, foamed plastic, brick, or ceramic can be used.

Third Embodiment

In the foregoing first and second embodiments, the structure of the induction heating device is a radial gap-type structure in which magnetic flux generating part 15 and heating part 13 are disposed to be opposed to each other at a distance in the radial direction of rotor 11. In a third embodiment, the structure of the induction heating device is an axial gap-type structure in which magnetic flux generating part 15 and heating part 13 are disposed to be opposed to each other at a distance in the axial direction of rotor 11. Referring to FIG. 10 to FIG. 13, an induction heating device 103 according to the third embodiment will be described below, mainly focusing on the difference from the first embodiment.

(Rotor and Heating Part)

Figure 10:
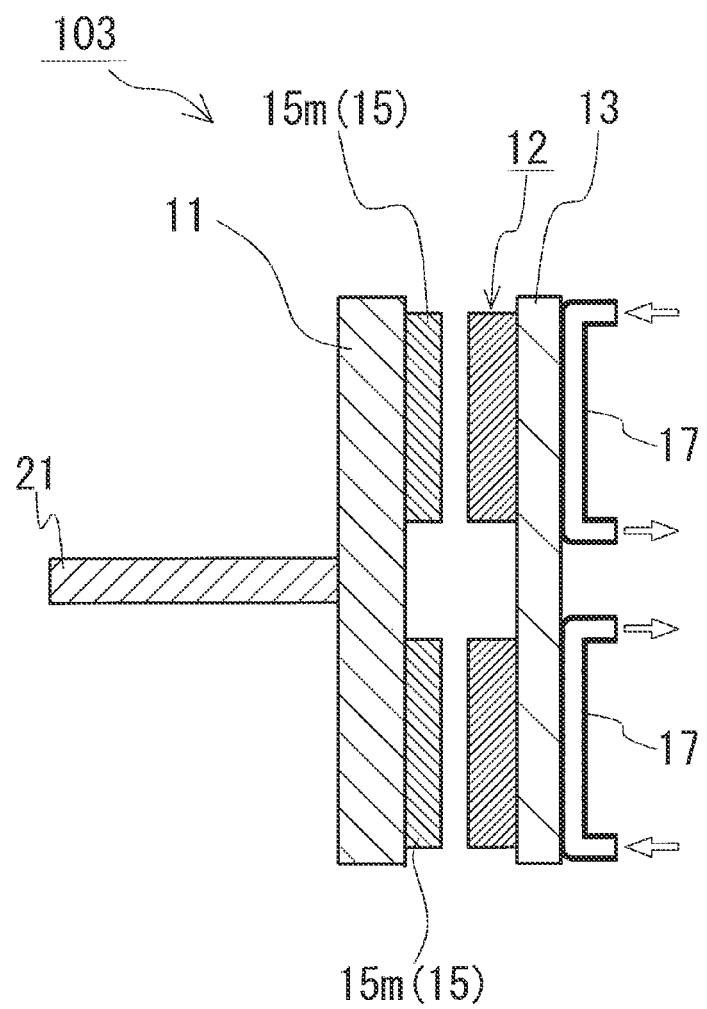
FIG. 10 is a schematic longitudinal-sectional view of an induction heating device according to a third embodiment.

Rotor 11 and heating part 13 are shaped like a plate (here, disc shape) and disposed with respective surfaces opposed to each other at a distance (see FIG. 10). Rotor 11 is coupled to one end side of rotation shaft 21 rotatably supported by a bearing (not shown). Heating part 13 is disposed to be opposed to rotor 11 at a distance in the axial direction and is fixed to a casing (not shown) so as not to rotate.

(Magnetic Flux Generating Part)

Figure 11:
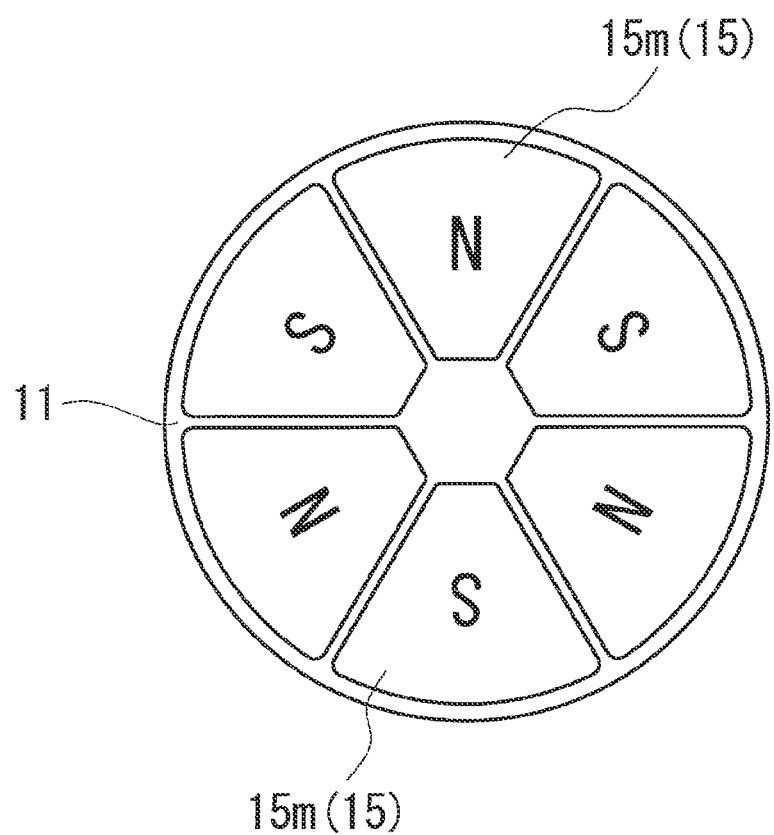
FIG. 11 is a schematic plan view showing the configuration of the magnetic flux generating part in the induction heating device according to the third embodiment.

On the opposed surface of rotor 11 opposed to heating part 13, magnetic flux generating part 15 is provided to generate magnetic flux in the axial direction (the direction of heating part 13) of rotor 11. In this example, magnetic flux generating part 15 is a permanent magnet 15m. As shown in FIG. 11, a plurality of sector-shaped permanent magnets 15m are arranged in a circle on the opposed surface of rotor 11, and the polarities of adjacent permanent magnets 15m are different from each other. Although FIG. 11 shows six magnetic flux generating parts 15 (permanent magnets 15m) by way of illustration, the number of magnetic flux generating parts 15 (permanent magnets 15m) is not limited thereto and can be set as appropriate. The number of magnetic flux generating parts 15 is, for example, preferably four or more, more preferably eight or more, further more preferably ten or more. A coil may be used as magnetic flux generating part 15.

(Magnetic Flux Guide Part)

Figure 12:
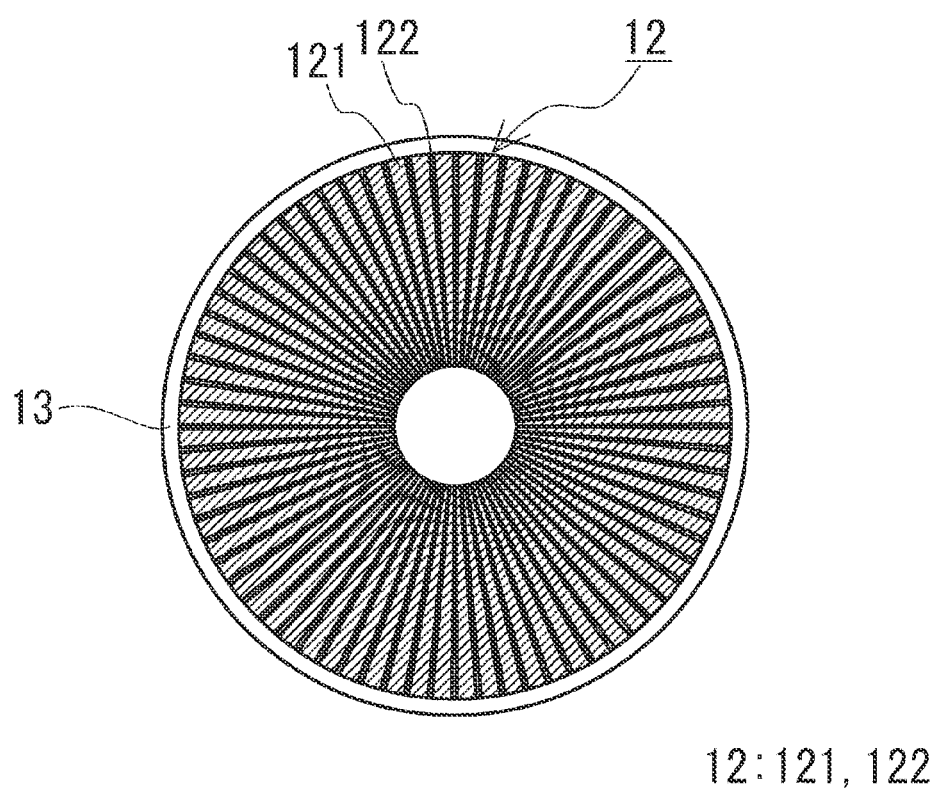
FIG. 12 is a schematic plan view showing the configuration of the magnetic flux guide part in the induction heating device according to the third embodiment.

On the opposed surface of heating part 13 that is opposed to magnetic flux generating part 15, magnetic flux guide part 12 is provided to guide the magnetic flux from magnetic flux generating part 15 to heating part 13. In this example, as shown in FIG. 10 and FIG. 12, magnetic substance parts 121 and insulator parts 122 are radially disposed on the opposed surface of heating part 13 and are alternately layered in the circumferential direction of heating part 13.

(Flow Passage)

Figure 13:
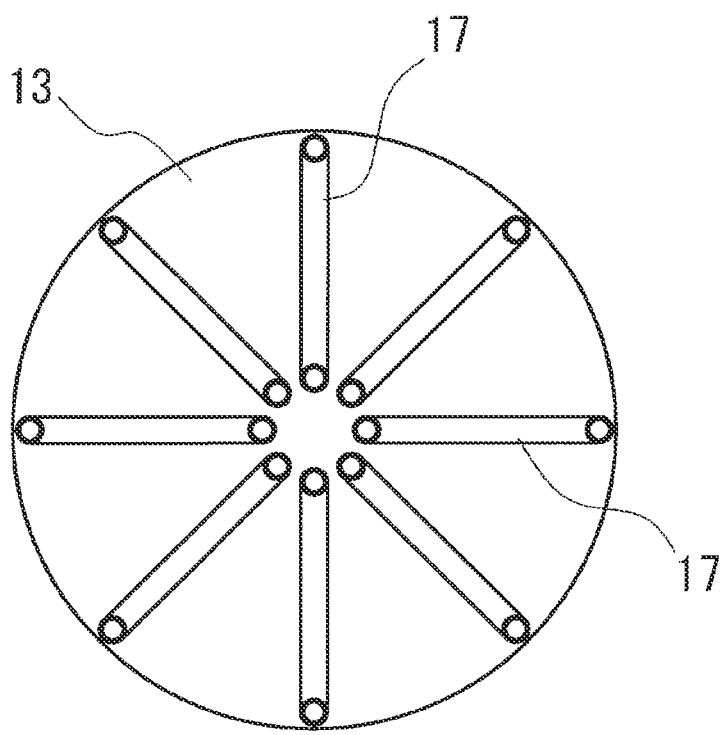
FIG. 13 is a schematic plan view showing the configuration of a flow passage in the induction heating device according to the third embodiment.

Flow passage 17 is provided along the radial direction of heating part 13. In this example, as shown in FIG. 10 and FIG. 13, a plurality of flow passages 17 are provided by radially disposing piping on the opposite surface of heating part 13 on the opposite side to the opposed surface that is opposed to rotor 11. In each flow passage 17, a heating medium circulates from one side to the other side in the radial direction of heating part 13 (from the outside to the inside in FIG. 10) (the white arrows in FIG. 10 show the supply/exit direction of the heating medium).

{Operation Effect}

In induction heating device 103 of the third embodiment, magnetic flux guide part 12 is provided on the opposed surface of heating part 13 that is opposed to magnetic flux generating part 15, in the same manner as in induction heating device 101 of the first embodiment. Thus, the magnetic flux from magnetic flux generating part 15 can be conducted to heating part 13 without being diffused. Accordingly, since magnetic flux generating part 15 and heating part 13 are at a distance from each other, the effect of heat on magnetic flux generating part 15 can be reduced. Furthermore, the magnetic flux from magnetic flux generating part 15 can be conducted to heating part 13 through magnetic flux guide part 12 without being diffused. Accordingly, the third embodiment can suppress temperature increase of the magnetic flux generating part and can increase the amount of heat generation in the heating part, in the same manner as the first embodiment of the radial gap type.

As described in Modification 1-1 of the first embodiment, also in the axial gap-type induction heating device 103 of the third embodiment, flow passage 17 may be provided not only in heating part 13 but also in magnetic flux guide part 12. In this case, the flow passage provided in magnetic flux guide part 12 may serve as an exit path, the flow passage provided in heating part 13 may serve as a return path, so that those flow passages form a round-trip passage. Furthermore, as described in Modification 1-2 of the first embodiment, in magnetic flux guide part 12, magnetic substance parts 121 may be arranged so as to be inclined relative to the radial direction of heating part 13. In addition, as described in the second embodiment, a plurality of magnetic flux guide parts 12 may be provided with spacing in the circumferential direction on the opposed surface of heating part 13. In this case, a heat insulating material may be disposed in the spacing between magnetic flux guide parts 12.

<Power Generation System>

Figure 14:
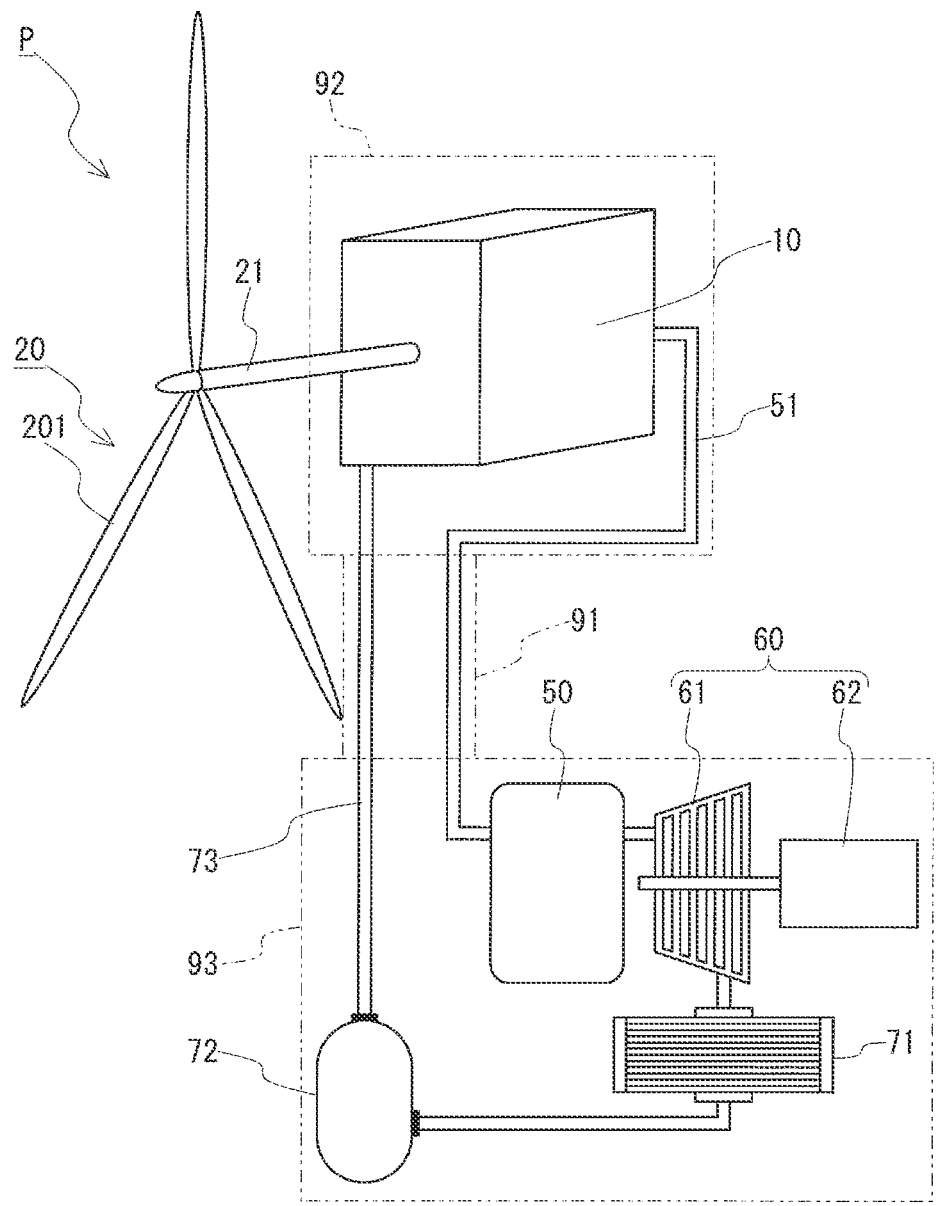
FIG. 14 is a schematic diagram showing an example of the overall configuration of a power generation system according to an embodiment of the present invention.

Referring to FIG. 14, an example of a power generation system according to an embodiment of the present invention will be described. A power generation system P shown in FIG. 14 includes an induction heating device 10, a wind turbine 20, a heat accumulator 50, and a power generating part 60. Wind turbine 20 is attached to a nacelle 92 installed on the top of a tower 91, and induction heating device 10 is stored in nacelle 92. Heat accumulator 50 and power generating part 60 are installed in a building 93 built on the bottom (base) of tower 91. The configuration of power generation system P will be described in detail below.

Induction heating device 10 is the induction heating device according to an embodiment of the present invention and, for example, induction heating devices 101 to 103 according to the foregoing first to third embodiments can be used. The other end side of rotation shaft 21 is directly coupled to wind turbine 20 described later, and wind is used as motive power for rotating the rotor. Here, the heating medium is water by way of example.

Wind turbine 20 has a structure in which rotation shaft 21 extending in the horizontal direction is set at the center and three blades 201 are radially attached to rotation shaft 21. In the case of a wind power generation system with an output exceeding 5 MW, the diameter is 120 m or more, and the number of revolutions is about 10 to 20 rpm.

The flow passage (piping) of induction heating device 10 is connected with a water supply pipe 73 for supplying water to induction heating device 10 and a transport pipe 51 for delivering water heated by induction heating device 10 to heat accumulator 50. In induction heating device 10, magnetic flux is produced from the magnetic flux generating part provided at the rotor, and when the rotor rotates, the magnetic flux passing through the heating part disposed at a distance from the rotor changes, thereby producing eddy current in the heating part to cause the heating part to generate heat and heat water in the flow passage. Induction heating device 10 heats water serving as a heating medium to, for example, high temperatures such as 100° C. to 600° C. Since induction heating device 10 is structured such that the heating part (flow passage) does not rotate, it is unnecessary to use a revolute joint for connecting the flow passage with transport pipe 51 and water supply pipe 73. Robust connection is implemented with a simple configuration, for example, using welding.

This power generation system P heats water to temperatures (for example 200° C. to 350° C.) suitable for power generation with induction heating device 10 and generates high-temperature and high-pressure water. The high-temperature and high-pressure water is delivered to heat accumulator 50 through transport pipe 51 coupling induction heating device 10 to heat accumulator 50. Heat accumulator 50 stores the heat of high-temperature and high-pressure water delivered through transport pipe 51 and supplies steam required for power generation to power generating part 60 using a heat exchanger. Alternatively, steam may be generated by induction heating device 10.

As heat accumulator 50, a steam accumulator, a sensible heat-type storage device that uses a molten salt, oil, or the like, or a latent heat-type storage device that utilizes phase change of a high-melting-point molten salt can be used, for example. The sensible heat-type storage method stores heat at a phase-change temperature of a heat storage material, and therefore, generally has a narrow band of heat storage temperatures as compared with the latent heat-type storage method, and exhibits a high heat storage density.

Power generating part 60 is a structure including steam turbine 61 and power generator 62 in combination, and steam supplied from heat accumulator 50 rotates steam turbine 61 to drive power generator 62 to generate power.

The high-temperature and high-pressure water or steam delivered to heat accumulator 50 is cooled by a condenser 71 back into water. The water is then delivered to a pump 72, which generates high-pressure water and delivers the high-pressure water to induction heating device 10 through water supply pipe 73, whereby water is circulated.

Since this power generation system P includes induction heating device 10 according to an embodiment of the present invention, the amount of heat generation in the heating part can be increased while temperature increase of the magnetic flux generating part is suppressed in induction heating device 10. Therefore, the efficiency of heating the heating medium in induction heating device 10 can be improved, and the power generation efficiency can be improved. In addition, the heat of the heating medium heated by induction heating device 10 can be stored in heat accumulator 50 to generate power, whereby stable power generation to meet a demand can be realized without using expensive storage batteries. Furthermore, wind turbine 20 is directly coupled to rotation shaft 21 of induction heating device 10, thereby avoiding troubles with speed increasers (gear boxes). Moreover, since the heat of the heating medium is supplied to power generating part 60 installed on, for example, the bottom (base) of tower 91 through transport pipe 51, it is not necessary to store power generating part 60 in nacelle 92, so that nacelle 92 installed on the top of tower 91 can be reduced in size and weight.

In power generation system P illustrated above, water is used as a heating medium. Alternatively, liquid metal having a thermal conductivity higher than water may be used as a heating medium. An example of such a liquid metal is liquid metal sodium. When liquid metal is used as a heating medium, for example, liquid metal may be used as a primary heating medium receiving heat from the heating part, and a secondary heating medium (water) may be heated through a heat exchanger by the heat of the liquid metal delivered through the transport pipe to generate steam.

For example, when oil, liquid metal, molten salt, or the like having a boiling point exceeding 100° C. at normal pressures is used as a heating medium, the internal pressure increase caused by vaporization of the heating medium in the flow passage can be suppressed more easily when it is heated to a predetermined temperature, compared with water.

Figure 15:
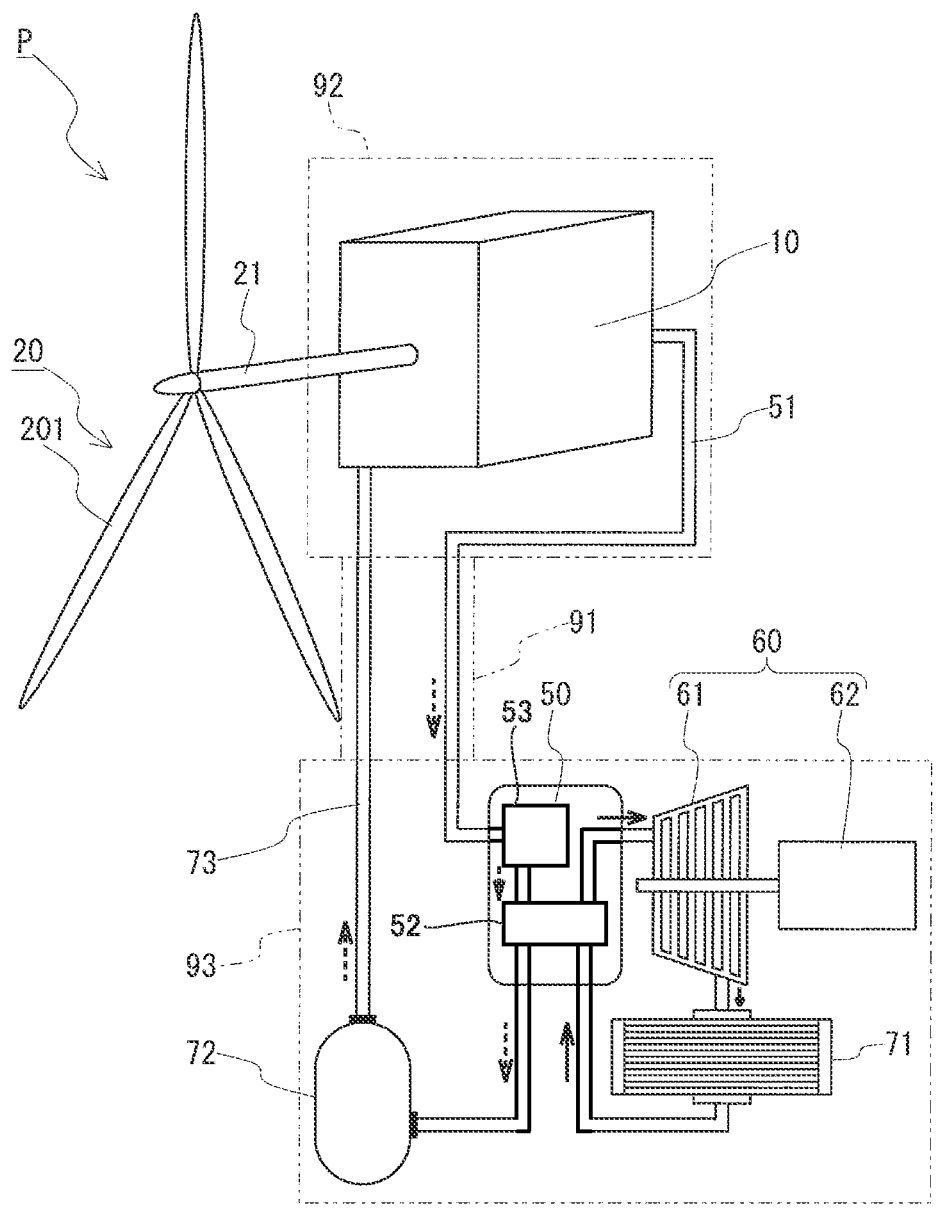
FIG. 15 is a schematic diagram showing an example of the overall configuration of the power generation system according to an embodiment of the present invention.

Power generation system P may have a configuration shown in FIG. 15. Heat accumulator 50 may include a heat exchanger 52 and a heat accumulating unit 53.

Heat stored in heat accumulator 50 can be used for generating vapor necessary for power generation using heat exchanger 52. As shown in FIG. 15, heat exchanger 52 and heat accumulating unit 53 are included in heat accumulator 50. Power generation system P has first and second loops. The first loop allows a heating medium to circulate and includes transport pipe 51, heat accumulator 50, and water supply pipe 73. The second loop supplies vapor to steam turbine 61 and includes steam turbine 61, steam condenser 71, and heat exchanger 52.

To be consistent with FIG. 14, piping for returning the heating medium from pump 72 to induction heating device 10 is named "water supply pipe". However, in the configuration shown in FIG. 15, the heating medium circulating through the first loop is not limited to water or water vapor. As described above, the heating medium may be oil, liquid metal, or molten salt.

The induction heating device according to embodiments of the present invention can be used in a power generation system using renewable energy (for example, wind power) and also can be used, for example, in a hot water supply system or an air heating system. The power generation system according to embodiments of the present invention is suitably applied in the field of power generation using renewable energy.

DESCRIPTION OF THE REFERENCE SIGNS 10, 101 to 103 induction heating device, P power generation system, 11 rotor, 111 projection, 12 magnetic flux guide part, 121 magnetic substance part, 122 insulator part, 13 heating part, 15 magnetic flux generating part, 15c coil, 15m permanent magnet, 17 flow passage, 171 flow passage (exit path), 172 flow passage (return path), 175 connection pipe, 19 heat insulating material, 21 rotation shaft, 20 wind turbine, 201 blade, 50 heat accumulator, 51 transport pipe, 52 heat exchanger, 53 heat accumulating unit, 60 power generating part, 61 steam turbine, 62 power generator, 71 steam condenser, 72 pump, 73 water supply pipe, 91 tower, 92 nacelle, 93 building.

The invention claimed is:

1. An induction heating device that heats a heating medium, comprising:
   a rotor having a rotation shaft;
   a heating part disposed to be opposed to said rotor at a distance;
   a magnetic flux generating part provided at said rotor to generate magnetic flux for said heating part;
   a magnetic flux guide part provided on an opposed surface side of the heating part that is opposed to the magnetic flux generating part to guide the magnetic flux from the magnetic flux generating part to the heating part; and
   a flow passage provided in said heating part to allow said heating medium to circulate, wherein
   said magnetic flux guide part
   includes magnetic substance parts formed of a magnetic material and insulator parts formed of a non-magnetic and electrically insulating material, and
   has a structure in which said magnetic substance parts and said insulator parts extend along a direction from said magnetic flux generating part to said heating part and are alternately layered along a circumferential direction of said heating part.

2. The induction heating device according to claim 1, wherein said magnetic flux guide part includes a layered body including a plurality of electrical steel sheets, the electrical steel sheets being layered and each having an insulating coating.

3. The induction heating device according to claim 1, wherein said magnetic flux guide part is provided over the entire opposed surface of said heating part.

4. The induction heating device according to claim 1, wherein a plurality of said magnetic flux guide parts are provided on the opposed surface of said heating part with spacing in the circumferential direction of said heating part.

5. The induction heating device according to claim 4, wherein a heat insulating material is disposed in said spacing between said magnetic flux guide parts.

6. The induction heating device according to claim 1, wherein
   said flow passage is formed such that said heating part and said magnetic flux guide part are provided with respective flow passages and one ends of said flow passages are connected to each other so that said flow passages form a round-trip passage, and
   of said flow passages, one flow passage provided in said magnetic flux guide part serves as an exit path of said heating medium, and the other flow passage provided in said heating part serves as a return path of said heating medium.

7. The induction heating device according to claim 1, wherein said rotation shaft is connected to a wind turbine.

8. A power generation system comprising:
   an induction heating device that heats a heating medium, comprising:
      a rotor having a rotation shaft;
      a heating part disposed to be opposed to said rotor at a distance;
      a magnetic flux generating part provided at said rotor to generate magnetic flux for said heating part;
      a magnetic flux guide part provided on an opposed surface side of the heating part that is opposed to the magnetic flux generating part to guide the magnetic flux from the magnetic flux generating part to the heating part; and
      a flow passage provided in said heating part to allow said heating medium to circulate,
      wherein said magnetic flux guide part
         including magnetic substance parts formed of a magnetic material and insulator parts formed of a non-magnetic and electrically insulating material, and
         having a structure in which said magnetic substance parts and said insulator parts extend along a direction from said magnetic flux generating part to said heating part and are alternately layered along a circumferential direction of said heating part; and
   a power generating part configured to convert heat of said heating medium heated by said induction heating device into electric energy.

* * * * *